(12) United States Patent
Carolan

(10) Patent No.: US 7,468,092 B2
(45) Date of Patent: *Dec. 23, 2008

(54) OPERATION OF MIXED CONDUCTING METAL OXIDE MEMBRANE SYSTEMS UNDER TRANSIENT CONDITIONS

(75) Inventor: Michael Francis Carolan, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 538 days.

This patent is subject to a terminal disclaimer.

(21) Appl. No.: 11/115,778

(22) Filed: Apr. 27, 2005

(65) Prior Publication Data

US 2006/0060081 A1 Mar. 23, 2006

Related U.S. Application Data

(63) Continuation-in-part of application No. 10/943,574, filed on Sep. 17, 2004, now Pat. No. 7,311,755.

(51) Int. Cl.
*B01D 53/22* (2006.01)
(52) U.S. Cl. ............... 95/54; 95/15; 95/19; 95/45; 96/4; 96/7; 96/11
(58) Field of Classification Search ............ 95/14, 95/15, 19, 43, 45, 54; 96/4, 7, 11; 429/12, 429/13, 33
See application file for complete search history.

(56) References Cited

U.S. PATENT DOCUMENTS

| | | | |
|---|---|---|---|
| 4,211,537 A | 7/1980 | Teitel | 48/191 |
| 5,409,046 A | 4/1995 | Swenson et al. | 141/11 |
| 5,702,491 A | 12/1997 | Long et al. | 48/197 R |
| 5,725,965 A | 3/1998 | Wachsman et al. | 429/33 |
| 5,762,119 A | 6/1998 | Platz et al. | 141/231 |
| 5,778,972 A | 7/1998 | Sapru et al. | 165/104.12 |
| 5,837,125 A | 11/1998 | Prasad et al. | |
| 5,861,137 A | 1/1999 | Edlund | 423/652 |
| 5,911,860 A | 6/1999 | Chen et al. | 204/295 |
| 5,954,101 A | 9/1999 | Drube et al. | 141/82 |
| 5,964,965 A | 10/1999 | Schulz et al. | 148/420 |
| 5,983,962 A | 11/1999 | Gerardot | 141/231 |
| 5,997,594 A | 12/1999 | Edlund et al. | 48/76 |
| 6,056,807 A | 5/2000 | Carolan et al. | |
| 6,090,500 A * | 7/2000 | Ishihara et al. | 96/4 |
| 6,193,929 B1 | 2/2001 | Ovshinsky et al. | 420/402 |
| 6,221,117 B1 | 4/2001 | Edlund et al. | 48/76 |
| 6,305,442 B1 | 10/2001 | Ovshinsky et al. | 141/231 |
| 6,375,906 B1 | 4/2002 | Edlund et al. | 422/189 |
| 6,492,290 B1 * | 12/2002 | Dyer et al. | 96/11 |
| 6,503,296 B1 * | 1/2003 | Vigeland et al. | 95/54 |
| 6,745,801 B1 | 6/2004 | Cohen et al. | 141/231 |
| 2002/0022568 A1 | 2/2002 | Mackay et al. | |
| 2002/0029820 A1 | 3/2002 | Ovshinsky et al. | 141/110 |
| 2002/0073618 A1 | 6/2002 | Ovshinsky et al. | 48/61 |
| 2002/0106495 A1 | 8/2002 | Sirman et al. | |
| 2003/0009942 A1 | 1/2003 | Amendola et al. | 48/61 |

FOREIGN PATENT DOCUMENTS

| | | |
|---|---|---|
| CN | 1127235 A | 7/1996 |
| EP | 0 705 790 A1 | 4/1996 |
| EP | 0957063 | 11/1999 |
| WO | 01/28017 | 4/2001 |
| WO | 01/92147 | 12/2001 |
| WO | WO 02/16015 A1 | 2/2002 |

OTHER PUBLICATIONS

S. B. Adler, "Chemical Expansivity of Electrochemical Ceramics", J. Am. Ceram. Soc. 84 (9) 2117-19 (2001).
P. V. Hendriksen, et al., "Prospects and Problems of Dense Oxygen Permeable Membranes", Catalysis Today 56, (2000) 283-295.
Martijn H. R. Lankhorst, et al., "Use of the Rigid Band Formalism to Interpret the Relationship Between O Chemical Potential and Electron Concentration in $La_{1-x}Sr_xCoO_{3-\delta}$", 1996 The American Physical Society, Physical Review Letters vol. 77, No. 14, Sep. 30, 1996, pp. 2989-2992.
W. Rodger Cannon, et al., "Review Creep of Ceramics", Journal of Materials Science 18 (1983) 1-50.
Idatech Product Brochure, 2002.
Proton Energy Systems Product Brochure, Rev. Aug. 2001 and Jun. 2001.
Millennium Cell—Website for Hydrogen on Demand Fact Sheet, downloaded Jan. 24, 2003.
Proton Energy Systems—Website for Hydrogen Generator download brochure, downloaded on Feb. 11, 2003.
European Search Report No. 05019991.8-2113 dated Feb. 16, 2006.

* cited by examiner

*Primary Examiner*—Jason M Greene
(74) *Attorney, Agent, or Firm*—Keith D. Gourley (57) ABSTRACT

Method of operating an oxygen-permeable mixed conducting membrane having an oxidant feed side, an oxidant feed surface, a permeate side, and a permeate surface, which method comprises controlling the differential strain between the permeate surface and the oxidant feed surface at a value below a selected maximum value by varying the oxygen partial pressure on either or both of the oxidant feed side and the permeate side of the membrane.

38 Claims, 2 Drawing Sheets

OPERATION OF MIXED CONDUCTING METAL OXIDE MEMBRANE SYSTEMS UNDER TRANSIENT CONDITIONS

CROSS-REFERENCE TO RELATED APPLICATIONS

This application is a continuation-in-part of U.S. patent application Ser. No. 10/943,574, filed Sep. 17, 2004 now U.S. Pat. No. 7,311,755, the Specification and claims which are specifically incorporated by reference and made a part of this application.

STATEMENT REGARDING FEDERALLY SPONSORED RESEARCH OR DEVELOPMENT

This invention was made in part with Government support under Cooperative Agreement No. DE-FC26-98FT40343 between Air Products and Chemicals, Inc., and the U.S. Department of Energy. The Government has certain rights to this invention.

BACKGROUND OF THE INVENTION

Ceramic materials containing certain mixed metal oxide compositions possess both oxygen ion conductivity and electronic conductivity at elevated temperatures. These materials, known in the art as mixed conducting metal oxides, may be used in applications including gas separation membranes and membrane oxidation reactors. These ceramic membranes are made of selected mixed metal oxide compositions and have been described as ion transport membranes (ITM). A characteristic property of these materials is that their oxygen stoichiometry is a thermodynamic function of temperature and oxygen partial pressure wherein the equilibrium oxygen stoichiometry decreases with increasing temperature and with decreasing oxygen partial pressure.

It is known that the dimensions of materials change with changing temperature due to thermal expansion and contraction. In addition to these thermal dimensional changes, mixed conducting metal oxide materials undergo chemical dimensional changes that are functions of the metal oxide oxygen stoichiometry. At isothermal conditions, an article made of mixed conducting metal oxide material will increase in dimensions with decreasing oxygen stoichiometry. At isothermal conditions, the oxygen stoichiometry decreases with decreasing oxygen partial pressure. Since the equilibrium oxygen stoichiometry increases with decreasing temperature, an article made of mixed conducting metal oxides will contract due to both thermal and chemical dimensional changes as the temperature decreases at a constant oxygen partial pressure. Conversely, an article made of mixed conducting metal oxides will expand by both thermal and chemical dimensional changes as the temperature increases at a constant oxygen partial pressure. This is described in an article entitled "Chemical Expansivity of Electrochemical Ceramics" by S. B. Adler in *J. Am. Ceram. Soc.* 84 (9) 2117-19 (2001).

Dimensional changes therefore result from equilibrium oxygen stoichiometry changes in mixed conducting metal oxide materials. Changing the temperature at a constant oxygen partial pressure or changing the oxygen partial pressure at a constant temperature will change the equilibrium oxygen stoichiometry of the mixed conducting metal oxide material. When a mixed conducting metal oxide is used as an ion transport membrane, for example, an oxygen partial pressure difference across the membrane creates a difference in the equilibrium oxygen stoichiometry at each of the two surfaces of the membrane, which in turn creates the thermodynamic driving force for oxygen ions to diffuse through the membrane.

During startup or shutdown of a gas separation system using mixed conducting metal oxide membranes, the temperature is increased or decreased and the oxygen partial pressure on one or both sides of the membrane may change. The equilibrium oxygen stoichiometry of the membrane material will change in response to the changes in temperature and oxygen partial pressure. Oxygen anions will diffuse into or out of the membrane material and the membrane material will approach its equilibrium oxygen stoichiometry value. As the oxygen stoichiometry and temperature changes, the dimension of the membrane will change. The time required for the membrane to reach chemical equilibrium with the oxygen partial pressures on the surfaces of the membrane will depend on the oxygen anion diffusion rate into or out of the membrane. The time required for equilibration to occur is a function of the material composition, the temperature, and the dimensions of the membrane modules.

Different membrane compositions will have different oxygen anion diffusivities, and compositions with higher diffusivities will equilibrate with the gas phase faster, all other factors being equal. For a given membrane composition, the oxygen anion diffusivity increases exponentially with temperature. Therefore, equilibration times decrease with increasing temperature. Finally, the equilibration time increases approximately with the square of the characteristic dimension (e.g., length or thickness) of the parts in the membrane modules. Therefore, thinner parts will equilibrate faster than thicker parts, all other factors being equal. As the thickness of a part increases and as the temperature decreases, it becomes increasingly difficult to keep the interior of the part in equilibrium with the gas phase due to sluggish diffusion of oxygen anions into or out of the part.

It is known that temperature gradients in a mixed conducting metal oxide ceramic part can create differential strains due to differential thermal expansion and contraction. Similarly, oxygen stoichiometry gradients in a ceramic part can create differential strains due to differential chemical expansion and contraction. This gradient in oxygen stoichiometry may be sufficiently large to create a correspondingly large differential chemical expansion, and therefore large mechanical stresses, that lead to failure of the part. Therefore, it is desirable to avoid differential chemical expansion or at least to control the differential chemical expansion to below maximum allowable values.

There is a need in applications of mixed conducting metal oxide ceramics for methods to heat or cool ceramic articles such as membranes at faster rates without producing unacceptable stresses in the articles. Also, there is a need to determine maximum allowable rates of change in oxygen partial pressures at essentially constant temperatures in order to avoid unacceptable stresses in the articles. However, few solutions have been proposed to solve these problems to date. In one approach, U.S. Pat. No. 5,911,860 discloses the use of composite membranes containing mechanically enhancing constituents such as metals to improve the mechanical properties of mixed conducting metal oxide membranes. Membranes are disclosed that have a matrix material which conducts at least one type of ion, preferably oxygen ions, and at least one constituent which is physically distinct from the matrix material and which enhances the mechanical properties, the catalytic properties, and/or the sintering behavior of the matrix material. The constituent is present in a manner which precludes continuous electronic conductivity through the constituent across the membrane. In a preferred embodiment the matrix material is a mixed conductor which exhibits both electronic and oxygen ion conductivity. The constituent preferably is a metal such as silver, palladium, or a mixture thereof. In other embodiments, the constituent is a ceramic or other electrically nonconductive material. These proposed membrane compositions thus have mechanical properties that allow faster heating and cooling than membrane compositions previously known in the art.

In an article entitled "Prospects and Problems of Dense Oxygen Permeable Membranes", *Catalysis Today* 56, (2000) 283-295, P. V. Hendricksen et al describe the problem of mechanical failure of mixed conductor membranes under oxygen partial pressure gradients at steady state operating conditions. It is disclosed that oxygen partial pressure gradients will produce differential chemical expansion that can lead to mechanical failure of the membrane. It is proposed that surface kinetic resistances will decrease the maximum tensile stress in a membrane, especially as the membrane thickness is decreased. Therefore, using thin membranes that have surface kinetic resistances may reduce the maximum tensile stress. However, while the surface kinetic resistances may reduce the maximum tensile stress, the surface kinetic resistances will also decrease the oxygen flux obtained from the membrane, and this in turn would increase the membrane area required for a given oxygen production rate and hence decrease the economic benefit of the membrane process.

U.S. Pat. No. 5,725,965 teaches the use of functionally gradient, compositionally layered, solid state electrolytes and membranes to prevent chemical reduction of membrane layers during operation. This layered membrane structure may reduce the differential chemical expansion during steady state operation but does not address the problem of chemical dimensional changes caused by heating or cooling of the membrane structure.

There is a need in the art for improved methods to reduce the potential for mechanical damage due to dimensional changes during the heating and cooling of articles and systems fabricated from mixed conducting metal oxide materials, particularly in the operation of membrane gas separation and reactor systems under transient values of temperature, pressure, and gas composition. There also is a need for methods to control the differential strain across the membranes in a membrane module when oxygen partial pressures in the module are changed after the module has been heated to an elevated temperature. These needs are addressed by embodiments of the invention disclosed below and defined by the claims that follow.

BRIEF SUMMARY OF THE INVENTION

An embodiment of the invention relates to a method of operating an oxygen-permeable mixed conducting membrane having an oxidant feed side, an oxidant feed surface, a permeate side, and a permeate surface, which method comprises controlling the differential strain between the permeate surface and the oxidant feed surface at a value below a selected maximum value by varying the oxygen partial pressure on either or both of the oxidant feed side and the permeate side of the membrane. The temperature of the membrane may be maintained at an essentially constant temperature. The selected maximum value of the differential strain between the permeate surface and the oxidant feed surface may be less than about 1000 ppm.

The oxygen partial pressure on either or both of the oxidant feed side and the permeate side of the membrane may be varied either continuously or discontinuously. The oxygen partial pressure may be controlled on either or both of the oxidant feed side and the permeate side of the membrane by varying either or both of the oxygen mole fraction and the total gas pressure on either or both of the oxidant feed side and the permeate side of the membrane.

The oxygen partial pressure on the permeate side of the membrane may be controlled by (a) passing through the permeate side of the membrane a gaseous mixture comprising one or more reducing gases selected from CO, $H_2$, and $CH_4$ and one or more oxygen-containing gases selected from $CO_2$ and $H_2O$; and (b) varying the composition of the gaseous mixture and optionally the total gas pressure on the permeate side of the membrane.

The mixed conducting metal oxide material may have the general stoichiometric composition $(Ln_{1-x}A_x)_w(B_{1-y}B'_y)O_{3-\delta}$, wherein Ln represents one or more elements selected from La, the D block lanthanides of the IUPAC periodic table, and Y; wherein A represents one or more elements selected from Mg, Ca, Sr and Ba; wherein B and B' each represent one or more elements selected from Sc, Ti, V, Mn, Fe, Co, Ni, Cu, Cr, Al, Zr, Mg, and Ga; wherein $0 \leq x \leq 1$, $0 \leq y \leq 1$, and $0.95 < w < 1.05$; and wherein $\delta$ is a number that renders the compound charge neutral.

The mixed conducting metal oxide material may have the general stoichiometric composition $(La_xCa_{1-x})_wFeO_{3-\delta}$ wherein $1.0 > x > 0.5$, $1.1 \geq w > 1.0$, and $\delta$ is a number which renders the composition charge neutral. Alternatively, the mixed conducting metal oxide material may have the general stoichiometric composition $(La_xSr_{1-x})_wCoO_{3-\delta}$ wherein $1.0 > x > 0.1$, $1.05 \geq w > 0.95$, and $\delta$ is a number which renders the composition charge neutral. In one specific embodiment, the mixed conducting metal oxide material may have the general stoichiometric composition $(La_{0.4}Sr_{0.6})_wCoO_{3-\delta}$ wherein $1.05 \geq w > 0.95$ and $\delta$ is a number which renders the composition charge neutral.

Another embodiment of the invention includes a method of operating an oxygen-permeable mixed conducting membrane having an oxidant feed side, an oxidant feed surface, a permeate side, a permeate surface, and a membrane midplane equidistant from the oxidant feed surface and the permeate surface, which method comprises controlling the differential strain between the permeate surface and the midplane of the membrane at a value below a selected maximum value by varying the oxygen partial pressure on either or both of the oxidant feed side and the permeate side of the membrane. The selected maximum value of the differential strain between the permeate surface and the membrane midplane may be less than about 500 ppm.

An alternative embodiment of the invention relates to a method of operating an oxygen-permeable mixed conducting membrane having an oxidant feed side, an oxidant feed surface, a permeate side, and a permeate surface, wherein the method comprises (a) heating the membrane to a selected essentially constant temperature, introducing a first dioxygen-containing gas into the oxidant feed side, and introducing a second dioxygen-containing gas into the permeate side;

(b) determining the oxygen partial pressures on the feed and permeate sides of the membrane;

(c) determining an initial differential strain between the permeate surface and the oxidant feed surface of the membrane at the selected essentially constant temperature;

(d) determining a maximum allowable differential strain between the oxidant feed and permeate surfaces of the membrane at the selected essentially constant temperature; and (e) changing the oxygen partial pressure on either or both of the feed side and the permeate side at the selected essentially constant temperature, and maintaining the differential strain between the oxidant feed surface and the permeate surface at values less than the maximum allowable differential strain of (d).

The oxygen partial pressure on either or both of the oxidant feed side and the permeate side of the membrane may be controlled by varying either or both of the oxygen mole fraction and the total pressure on either or both of the oxidant feed side and the permeate side of the membrane. Alternatively, the oxygen partial pressure on the permeate side of the membrane may be controlled by (a) introducing into the permeate side of the membrane a gaseous mixture comprising one or more reducing gases selected from CO, $H_2$, and $CH_4$ and one or more oxygen-containing gases selected from $CO_2$ and $H_2O$; and (b) varying the composition of the gaseous mixture and optionally the total gas pressure on the permeate side of the membrane.

The oxygen partial pressure on either or both of the oxidant feed side and the permeate side of the membrane may be varied continuously or discontinuously. The mixed conducting metal oxide material may have the general stoichiometric composition $(Ln_{1-x}A_x)_w(B_{1-y}B'_y)O_{3-\delta}$, wherein Ln represents one or more elements selected from La, the D block lanthanides of the IUPAC periodic table, and Y; wherein A represents one or more elements selected from Mg, Ca, Sr and Ba; wherein B and B' each represent one or more elements selected from Sc, Ti, V, Mn, Fe, Co, Ni, Cu, Cr, Al, Zr, Mg, and Ga; wherein $0 \leq x \leq 1$, $0 \leq y \leq 1$, and $0.95 < w < 1.05$; and wherein $\delta$ is a number that renders the compound charge neutral. The mixed conducting metal oxide material may have the general stoichiometric composition $(La_xCa_{1-x})_wFeO_{3-\delta}$ wherein $1.0 > x > 0.5$, $1.1 \geq w \geq 1.0$, and $\delta$ is a number which renders the composition charge neutral. Alternatively, the mixed conducting metal oxide material may have the general stoichiometric composition $(La_xSr_{1-x})_wCoO_{3-\delta}$ wherein $1.0 > x > 0.1$, $1.05 \geq w > 0.95$, and $\delta$ is a number which renders the composition charge neutral. In one specific embodiment, the mixed conducting metal oxide material may have the general stoichiometric composition $(La_{0.4}Sr_{0.6})_wCoO_{3-\delta}$ wherein $1.05 \geq w > 0.95$ and $\delta$ is a number which renders the composition charge neutral.

A related embodiment of the invention includes a method of operating a mixed conducting membrane oxygen recovery system, the method comprising (a) providing at least one membrane module comprising a membrane made of mixed conducting metal oxide material, wherein the membrane has an oxidant feed side, an oxidant feed surface, a permeate side, and a permeate surface;

(b) heating the membrane and membrane module to a selected essentially constant temperature, introducing an oxygen-containing gas into the oxidant feed side, and withdrawing an oxygen-enriched gas from the permeate side;

(c) determining the oxygen partial pressures on the feed and permeate sides of the membrane;

(d) determining an initial differential strain between the oxidant feed surface and the permeate surface of the membrane at the selected essentially constant temperature;

(e) determining a maximum allowable differential strain between the oxidant feed surface and permeate surface of the membrane at the selected essentially constant temperature; and (f) changing the oxygen partial pressure on either or both of the feed side and the permeate side at the selected essentially constant temperature, and maintaining the differential strain between the permeate surface and the oxidant feed surface at values less than the maximum allowable differential strain.

The maximum value of the differential strain between the permeate surface and the oxidant feed surface may be less than about 1000 ppm. The oxygen partial pressure on either or both of the oxidant feed side and the permeate side of the membrane may be varied continuously or discontinuously.

The mixed conducting metal oxide material may have the general stoichiometric composition $(Ln_{1-x}A_x)_w(B_{1-y}B'_y)O_{3-\delta}$, wherein Ln represents one or more elements selected from La, the D block lanthanides of the IUPAC periodic table, and Y; wherein A represents one or more elements selected from Mg, Ca, Sr and Ba; wherein B and B' each represent one or more elements selected from Sc, Ti, V, Mn, Fe, Co, Ni, Cu, Cr, Al, Zr and Ga; wherein $0 \leq x \leq 1$, $0 \leq y \leq 1$, and $0.95 < w < 1.05$; and wherein $\delta$ is a number that renders the compound charge neutral. The mixed conducting metal oxide material has the general stoichiometric composition $(La_xSr_{1-x})_wCoO_{3-\delta}$ wherein $1.0 \geq x > 0.1$, $1.05 \geq w > 0.95$, and $\delta$ is a number which renders the composition charge neutral. More specifically, the mixed conducting metal oxide material may have the general stoichiometric composition $(La_{0.4}Sr_{0.6})_wCoO_{3-\delta}$ wherein $1.05 \geq w > 0.95$ and $\delta$ is a number which renders the composition charge neutral.

Another related embodiment of the invention includes a method of operating a mixed conducting membrane hydrocarbon oxidation system, which method comprises (a) providing at least one membrane module comprising a membrane made of mixed conducting metal oxide material, wherein the membrane has an oxidant feed side, an oxidant feed surface, a permeate side, and a permeate surface;

(b) heating the membrane and membrane module to a selected essentially constant temperature, introducing an oxygen-containing gas into the oxidant feed side of the membrane module, introducing a hydrocarbon-containing gas into the permeate side of the membrane module, and withdrawing a hydrocarbon oxidation product from the permeate side of the membrane module; and (c) determining the oxygen partial pressures on the oxidant feed and permeate sides of the membrane;

(d) determining an initial differential strain between the oxidant feed surface and the permeate surface of the membrane at the selected essentially constant temperature;

(e) determining a maximum allowable differential strain between the oxidant feed surface and the permeate surface of the membrane at the selected essentially constant temperature; and (f) changing the oxygen partial pressure on either or both of the oxidant feed side and the permeate side at the selected essentially constant temperature, and maintaining the differential strain between the permeate surface and the oxidant feed surface at values less than the maximum allowable differential strain.

The hydrocarbon-containing gas may comprise methane and the hydrocarbon oxidation product may comprise hydrogen and carbon monoxide. The maximum value of the differential strain between the permeate surface and the oxidant feed surface may be less than about 1000 ppm. The oxygen partial pressure on either or both of the oxidant feed side and the permeate side of the membrane may be varied continuously or discontinuously.

The oxygen partial pressure may be controlled by varying either or both of the oxygen mole fraction and the total gas pressure on either or both of the oxidant feed side and the permeate side of the membrane. The oxygen partial pressure on the oxidant feed side may be controlled by varying the oxygen mole fraction on the oxidant feed side. Alternatively, the oxygen partial pressure on the permeate side of the membrane may be controlled by (a) introducing into the permeate side of the membrane a gaseous mixture comprising one or more reducing gases selected from CO, $H_2$, and $CH_4$ and one or more oxygen-containing gases selected from $CO_2$ and $H_2O$; and (b) varying the composition of the gaseous mixture and optionally the total gas pressure on the permeate side of the membrane.

The mixed conducting metal oxide material may have the general stoichiometric composition $(Ln_{1-x}A_x)_w(B_{1-y}B'_y)O_{3-\delta}$, wherein Ln represents one or more elements selected from La, the D block lanthanides of the IUPAC periodic table, and Y; wherein A represents one or more elements selected from Mg, Ca, Sr and Ba; wherein B and B' each represent one or more elements selected from Sc, Ti, V, Mn, Fe, Co, Ni, Cu, Cr, Al, Zr, Mg, and Ga; wherein $0 \leq x \leq 1$, $0 \leq y \leq 1$, and $0.95 < w < 1.05$; and wherein $\delta$ is a number that renders the compound charge neutral. The mixed conducting metal oxide material may have the general stoichiometric composition $(La_xCa_{1-x})_wFeO_{3-\delta}$ wherein $1.0 > x > 0.5$, $1.1 \geq w \geq 1.0$, and $\delta$ is a number which renders the composition charge neutral.

DETAILED DESCRIPTION OF THE INVENTION

During thermal transients under constant oxygen partial pressures, mixed conducting metal oxide materials expand due to the evolution of oxygen from the solid lattice structure or contract due to the incorporation of oxygen into the solid. This phenomenon is known as chemical expansion. This expansion or contraction is in addition to the expansion or contraction expected due to thermal expansion. If the material is in the form of a membrane and the thermal transients occur too quickly, thicker parts of the membrane may not equilibrate rapidly enough with oxygen in the gas phases on the oxidant feed side and the permeate side of the membrane, and the membrane material will tend to expand or contract near the surfaces at a different rate than the material in the membrane interior. This will cause differential strains between the surfaces and the internal region of the membrane, and if the membrane cannot immediately change dimensions, this will produce mechanical stresses within the membrane that may cause the membrane to crack. This problem is magnified when the membrane is constrained within the membrane module structure, which reduces the ability of the membrane to change dimensions.

At constant temperature, oxygen will be incorporated into the solid lattice structure when the oxygen partial pressure increases and the membrane material will contract. Also, at constant temperature, oxygen will be evolved from the solid lattice structure when the oxygen partial pressure decreases and the membrane material will expand. If an oxygen partial pressure gradient is imposed across a mixed conducting metal oxide membrane by increasing the oxygen partial pressure on the first side of the membrane relative to the second side, oxygen will be incorporated into the lattice structure of the membrane on the first side exposed to the higher oxygen partial pressure. The first side of the membrane will tend to contract due to the incorporation of the oxygen into the lattice structure of the membrane material. If the membrane is constrained in the membrane module such that contraction cannot occur, a tensile stress will occur on the first side of the membrane and a corresponding compressive stress will occur on the second side of the membrane. If the magnitude of the tensile stress is large enough, the membrane may crack.

As used herein, the generic term "oxygen" includes all forms of oxygen comprising the element or moiety having an atomic number of 8. The generic term oxygen therefore includes oxygen ions, gaseous oxygen (dioxygen or $O_2$), and oxygen that exists in compounds in the gaseous, liquid, or solid state. An oxygen-containing gas is defined as a gas or gas mixture that includes, but is not limited to, one or more components selected from the group consisting of air, nitrogen, $O_2$, water, carbon monoxide, carbon dioxide, nitric oxide (NO), and nitrous oxide ($N_2O$). The term "oxygen partial pressure" as used herein means the partial pressure of dioxygen or $O_2$ in a gas mixture containing $O_2$ and other gaseous components. The term "activity" as used herein is the thermodynamic function, a, having the usual definition (see, for example, *Thermodynamics*, G. N. Lewis and M. Randall, revised by K. S. Pitzer and L. Brewer, $2^{nd}$ Edition, McGraw-Hill, 1961, pp 242-249).

One method to prevent the stresses that arise in membranes due to solid state oxygen gradients is to control the gas phase oxygen partial pressure so that the stoichiometric composition of the membrane material remains constant during heating and cooling. This method is defined as isocompositional heating and cooling. In isocompositional heating and cooling, the oxygen partial pressure on both sides of the membrane is varied along with the temperature so that the gas phase activity is essentially equal to the solid phase oxygen activity, thereby effecting chemical equilibrium between the gas and solid phases. When the gas phase and the solid phase are in chemical equilibrium, oxygen will not pass into or out of the membrane. Since oxygen does not pass into or out of the membrane, no gradients in oxygen vacancy concentration will occur in the membrane. As a result, since there are no oxygen vacancy gradients within the membrane, there will be no strain in the membrane due to differential chemical expansion.

Isocompositional heating and cooling requires that the feed and permeate sides of the membrane be at the same oxygen activity. However, during actual membrane operation, the feed and permeate sides are at different oxygen partial pressures and activities. Therefore, in the transition from an isocompositional condition to an operational condition (or conversely from an operational condition to an isocompositional condition), the oxygen partial pressures on one or both sides of the membrane must be changed, possibly at an essentially constant temperature. This change in the oxygen partial pressure will produce a differential strain between the feed and permeate surfaces of the membrane for the reasons described above. However, because the membrane is constrained, it cannot immediately change shape in response to the compositional change of the membrane material. This will generate a stress in the membrane, and if the stress is large enough, the membrane may fail.

This stress occurs because the membrane cannot immediately change shape, i.e., cannot exhibit the strain that would occur if the membrane were not constrained. The oxygen partial pressure may be changed slowly enough to allow the membrane to creep, i.e., to change shape slowly, which relaxes the chemical expansion stresses within the membrane. Stress relaxation by creep may be a useful solution in reducing the maximum stress a membrane experiences during transient conditions. Reducing the maximum stress would reduce the probability of failure of the stressed part. However, creep is a slow process and may increase the time required for startup, process transients, and shutdown of membrane systems.

A possible disadvantage of using creep relaxation is that the membrane may suffer damage during creep. There are several different creep mechanisms, one of which is grain boundary sliding wherein the grains of the ceramic slide past each other to allow the membrane to change shape slightly and relieve the stress within the membrane. As the grains slide past each other, cavities may form at the grain boundaries, and these cavities will tend to weaken the ceramic. This damage may be cumulative, and the size and/or number of cavities may increase with increasing numbers of creep relaxation cycles. Other creep mechanisms also can produce damage that may weaken the ceramic. The subject of creep of ceramics is reviewed, for example, by W. Cannon and T. Langdon in *Journal of Materials Science* (18), 1983, pp. 1-50.

The embodiments of the present invention described below control the stress in a membrane within acceptable ranges by controlling the oxygen partial pressure in a specific manner during process transients so that stress in the membrane is reduced and controlled within an acceptable range. Because stress is difficult to measure or calculate in mixed conducting metal oxide membranes, the embodiments of the present invention are defined in terms of the differential strain that would occur immediately as a result of stoichiometric composition changes in the membrane if the membrane were not constrained. As explained below, the differential strain due to stoichiometric composition changes in the membrane may change slowly as the membrane creeps and changes shape to relax the initial stresses caused by chemical expansion and/or contraction.

The term "differential strain" as used herein means the difference between the strain in the membrane material at the low oxygen partial pressure, permeate surface of the membrane and the strain in the membrane material on the high oxygen partial pressure, oxidant feed surface of the membrane that would occur in an unconstrained membrane due to changes in the stoichiometric compositions of the membrane material at one or both surfaces of the membrane at a given essentially constant temperature. In some instances, it may be more convenient to define differential strain as the difference between the strain in the membrane material at the low oxygen partial pressure, permeate surface of the membrane and the strain in the membrane material at the midplane of the membrane (i.e., a plane equidistant from the oxidant feed surface and a permeate surface) that would occur in an unconstrained membrane due to changes in the stoichiometric compositions of the membrane material at one or both surfaces of the membrane at a given essentially constant temperature. In the use of a midplane, it is assumed that the stress and strain profiles across the membrane are symmetric and that the stress at the midplane is zero. Examples herein which use the midplane are clearly stated.

Thus when the stoichiometric compositions of the membrane material at both surfaces of the membrane are equal at a given essentially constant temperature, the differential strain is zero. When the stoichiometric compositions of the membrane material are different at each surface of the membrane at a given essentially constant temperature, the differential strain will be non-zero and may have either a positive or negative value depending on actual membrane geometry, membrane stoichiometry, and gas compositions. The term "essentially constant" as applied to temperature means an absolute temperature that varies by no more than ±5%.

The term "crept differential strain" means the differential strain between the membrane material at either surface of the membrane, wherein the membrane has a different stoichiometric composition at each surface that would occur in an actual constrained membrane after a period of time sufficient to allow creep to reduce the stress in the membrane. The crept differential strain may reach zero or may reach a positive or negative residual value. The residual stress resulting from the crept differential strain may be zero or may have non-zero values wherein a residual stress profile exists within the membrane. The term "uncrept differential strain" means the differential strain that would occur in a constrained membrane before any creep occurs to reduce the stress.

The term "membrane" as used herein includes any planar or non-planar membrane comprising mixed conducting metal oxide material. The membrane has two opposing surfaces, i.e., an oxidant feed surface and a permeate surface. Each surface of the membrane defines the interface between the solid membrane material and an adjacent gas phase. The membrane may have a composite structure wherein a dense layer of mixed conducting metal oxide material is bonded to the surface of a porous support of mixed conducting metal oxide material. The mixed conducting metal oxide material of the dense layer and the porous support may be the same or different. When the mixed conducting metal oxide material of the dense layer and the porous support are the same, the strain in the dense layer at the first surface of the porous support is the same as the strain at the first surface of the porous support adjacent the dense layer. The mixed metal oxide material possesses both oxygen ion conductivity and electronic conductivity at elevated temperatures and the membrane requires no attached electrodes to transfer electrons to or from the membrane.

The term "stress" has the usual meaning of a force or system of forces that tends to strain or deform a body. In membrane materials, these forces are caused by the chemical expansion or contraction due to stoichiometric composition changes in the membrane as earlier described. The term "strain" has the usual meaning of a deformation produced by a stress. Strain in mixed conducting metal oxide materials is defined as the difference between (1) a dimension of an article or body at selected conditions of temperature, total gas pressure, and gas composition and (2) the dimension at a set of reference conditions of temperature, total gas pressure, and gas composition. Strain is defined as the ratio $(D_s-D_r)/D_r$ where $D_s$ is the dimension at the selected conditions and $D_r$ is the dimension at the reference conditions. The value of $D_r$ may be defined, for example, at a temperature of 25° C., a gas composition of 100% oxygen, and a gas total pressure of 1.0 atma. Differential strain may be expressed in fractional ratios or parts per million (ppm), both of which are relative dimensionless units.

A membrane typically is installed in a module forming at least two gas passages or regions separated by the membrane, wherein a passage is formed on the oxidant feed side of the membrane and another passage is formed on the permeate side of the membrane. The oxidant feed side of the membrane is defined as a passage or region adjacent the oxidant feed surface of the membrane and the permeate side of the membrane is defined as a passage or region adjacent the permeate surface of the membrane. The oxidant feed side has an inlet adapted to provide dioxygen-containing gas for contacting with the membrane oxidant feed surface and an outlet adapted for withdrawal of dioxygen-depleted gas from the oxygen feed side of the membrane. When the membrane is used for oxygen separation, the permeate side of the membrane collects permeated oxygen, which is withdrawn through an outlet in the permeate side of the membrane. Optionally, the permeate side may have an inlet adapted for introducing a sweep gas into the permeate side of the membrane. When the membrane is used as an oxidation reactor, the permeate side of the membrane has an inlet that is adapted for introducing a hydrocarbon-containing gas into the permeate side of the membrane. This gas reacts with permeated oxygen to form reaction products, which are withdrawn from the outlet of the permeate side of the membrane.

It follows from the above description, therefore, that by definition a membrane has an oxidant feed surface, an oxidant feed side adjacent the oxidant feed surface, a permeate surface, and a permeate side adjacent the permeate surface.

The term "continuous" as applied to changes in the oxygen partial pressure on either or both of the oxidant feed side and the permeate side of a membrane means that the oxygen partial pressure is always being changed during a particular period of time. The rate of change in the oxygen partial pressure may vary during intervals in this period of time. The term "discontinuous" as applied to changes in the oxygen partial pressure on either or both of the oxidant feed side and the permeate side of a membrane means that the oxygen partial pressure is changed during a time interval and is not changed during an immediately following time interval. Discontinuous changes to oxygen partial pressure may continue through additional time intervals.

The indefinite articles "a" and "an" as used herein mean one or more when applied to any feature or features of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

The temperature of the membrane may increase or decrease for any reason. For example, the temperature of the membrane is increased during startup from ambient temperature to operating temperature and is decreased during shutdown from operating temperature to ambient temperature. Alternatively, the temperature of the membrane may be increased or decreased during operation from a first operating temperature to a second operating temperature as required for process reasons. The operating temperature of the membrane may change, for example, in response to changes in the temperature and/or composition of the gas at the oxidant feed side and/or the permeate side of the membrane. Alternatively, the oxygen partial pressure on either or both sides of the membrane may change at essentially constant temperature after the membrane system has been heated to an elevated temperature, for example, the membrane system operating temperature. Embodiments of the present invention may be applied during any changes in oxygen partial pressure, particularly at any essentially constant temperature.

Embodiments of the present invention may be applied to a membrane system designed and operated for oxygen recovery in which permeated oxygen is withdrawn from the permeate side of the membrane. The membrane system may be operated to recover a high-purity oxygen product from a dioxygen-containing gas such as air; a sweep gas may be used on the permeate side if desired. Alternatively, the system may be used to purify a gas containing oxygen as an impurity and may utilize a sweep gas on the permeate side. In these embodiments, the permeate side of the membrane may have an outlet but no inlet; alternatively, the permeate side of the membrane may have both an inlet and an outlet.

In another embodiment, the system may be operated as an oxidation or partial oxidation reactor in which permeated oxygen is reacted on the permeate side with a hydrocarbon-containing gas to yield hydrocarbon oxidation or partial oxidation products. For example, natural gas may be introduced into the permeate side of the membrane module and react therein with oxygen to form synthesis gas comprising hydrogen and carbon monoxide. In this embodiment, the permeate side of the membrane typically has both an inlet and an outlet.

The temperatures at all points in the membrane during operation may not be equal and temperature profiles may exist between any two points within or on the surface of the membrane. For this reason, the terms "temperature of the membrane" and "membrane temperature", as well as any uses of the term "temperature" in reference to the membrane, mean the average temperature of the membrane. In the present disclosure, the average temperature of the membrane in an oxygen separation module is defined generically as the arithmetic average of the gas temperatures at (1) the oxidant feed side inlet, (2) the oxidant feed side outlet, (3) the permeate side at a location across the membrane opposite the oxidant feed side inlet, and (4) the permeate side outlet. For embodiments in which the permeate side has both an inlet and an outlet, for example, an oxygen separation module with a permeate sweep gas or a hydrocarbon oxidation reactor, the average temperature of the membrane in a module is defined as the arithmetic average of the gas temperatures at (1) the oxidant feed side inlet, (2) the oxidant feed side outlet, (3) the permeate side inlet, and (4) the permeate side outlet.

The oxygen partial pressure may be controlled by varying the concentration of dioxygen ($O_2$) in the gas phase and/or controlling the gas phase total pressure on either or both of oxidant feed side and the permeate side of the membrane. The gas phase may be a mixture comprising nitrogen or other inert gas and dioxygen ($O_2$); alternatively, the gas phase may be a mixture of gaseous components which form equilibrium amounts of dioxygen ($O_2$) at elevated temperatures. In this alternative, the oxygen partial pressure on the permeate side of the membrane may be controlled by (a) contacting the permeate side of the membrane with a gaseous mixture comprising one or more reducing gases selected from CO, $H_2$, and $CH_4$ and one or more oxygen-containing gases selected from $CO_2$ and $H_2O$, and (b) varying the composition of the gaseous mixture and optionally the total gas pressure on the permeate side of the membrane. For example, the mixture of gaseous components may include hydrogen and water. Alternatively, the mixture of gaseous components may include $H_2$, CO, and $H_2O$. In another alternative, the mixture of gaseous components may include CO and $CO_2$.

In order to minimize the generation of new differential strain that may occur in the membrane during changes to the oxygen partial pressure on either or both sides of the membrane at an essentially constant temperature, the oxygen partial pressures and activities on both sides of the membrane may be adjusted to maintain the same constant chemical expansion differential strain across the membrane or to control changes in the chemical expansion differential strain within acceptable limits. This will allow the oxygen partial pressures adjacent the membrane surfaces to be changed without producing excessive differential strains.

The control of differential strain in operating membrane modules during changes to the oxygen partial pressure may be effected by controlling the rate of change of the oxygen partial pressures on the oxidant feed and permeate sides of the membranes. This may be accomplished by placing the oxidant feed and permeate sides of the membranes in flow communication with separate gas sources and/or under separate control of the total pressure in the gas phase. Typically, specifications of the required piping and gas flow control systems for these purposes are included in the design of the membrane modules and the process pressure vessel in which the modules are installed.

Control of the gas atmosphere during the heating of newly-manufactured mixed conducting metal oxide membrane modules in the initial startup phase will be determined by the module manufacturing conditions. For example, the manufactured modules may be in an isocompositional condition in which the oxygen vacancy concentration is constant throughout the module material. The manufactured modules may have been cooled under constant oxygen activity conditions from the manufacturing conditions used for sintering and ceramic-to-ceramic sealing. Therefore, during the heating of a new module during initial startup, the prior manufacturing history of the module will dictate the control of heating and oxygen partial pressure gradients across the membrane. If isocompositional cooling was used in the last processing step in module manufacturing, then isocompositional heating may be used to bring the module to operating temperature during initial startup.

At the end of an isocompositional heating step during initial startup, the oxygen partial pressure on both sides of the membrane will be equal. To establish the oxygen partial pressure gradient across the membrane required for oxygen permeation, the oxygen partial pressure on one or both sides of the membrane may be changed in a controlled manner. The rate of oxygen partial pressure change may be controlled slowly to allow creep relaxation, or partial creep relaxation, of any chemical expansion differential strain created in the membrane during the oxygen partial pressure changes at an essentially constant temperature. When the changes in the oxygen partial pressure or pressures are complete, the membrane will be at the desired operating conditions of oxygen partial pressure gradient cross the membrane. Since an oxygen activity gradient exists across the membrane, the membrane will experience some differential strain due to chemical expansion, and stress will occur as a result. This stress will relax slowly due to creep and after sufficient operating time may eventually reach very low levels.

This relaxed chemical expansion stress state may be controlled by maintaining a constant differential strain across the membrane during all subsequent thermal transients or during partial pressure transients at essentially constant temperature. By maintaining a constant differential strain, the stress due to that strain will remain at the very low relaxed chemical expansion stress state produced by creep at the initial steady-state operating conditions. A constant differential strain during the shutdown of the membrane from operating conditions may be maintained by controlling the oxygen activity or partial pressure on one or both sides of the membrane to maintain the differential strain across the membrane at a desired value or within a desired range of values. Since the differential strain is maintained, no new stresses will be generated due to chemical expansion during cooldown from the membrane operating temperature. No creep relaxation steps will be required before or during cooling, and therefore additional creep damage to the membrane will not occur.

On subsequent heating of the modules from ambient conditions to operating conditions, the oxygen partial pressure again may be controlled to maintain the differential strain at the same constant value. This may be accomplished by following the same oxygen partial pressure-temperature profile that was followed during the prior cooldown step. All subsequent thermal cycles may utilize the same oxygen partial pressure-temperature profile to maintain the differential strain at a constant value.

In some instances, it may be advantageous to maintain the magnitude of the differential strain within a certain target range or below a target value rather than at a constant value. This may allow the use of simpler control schemes or less expensive process conditions, while still maintaining the advantages of rapid startup and shutdown or rapid changes in oxygen partial pressures while minimizing cumulative creep damage during repeated cycles. For example, the differential strain may be maintained at less than 50% of the uncrept differential strain at steady state operating conditions. More specifically, the differential strain may be maintained at less than 25%, and even less than 10%, of the uncrept differential strain at steady state operating conditions.

Embodiments of the present invention maintain membrane integrity by controlling the maximum differential strain in the membrane during changes in the oxygen partial pressure, particularly when operating the membrane at an essentially constant temperature. At essentially constant temperature, the differential strains are caused by chemical expansion of the membrane material as described above. One embodiment of the invention includes a method of operating an oxygen-permeable mixed conducting membrane by controlling the maximum value of the differential strain between the oxidant feed surface and the permeate surface while varying the oxygen partial pressure on either or both of the oxidant feed surface and the permeate surface of the membrane. For example, the maximum value of the differential strain between the lower oxygen partial pressure, permeate surface of the membrane and the midplane of the membrane may be controlled advantageously at values below about 500 ppm.

The rate of change of the differential strain in the membrane may be regulated by controlling the rate at which the oxygen partial pressure(s) are changed, particularly at essentially constant temperature. In particular, the oxygen partial pressure on either or both of the oxidant feed side and the permeate side of the membrane may be changed such that the rate of change of the difference between the oxygen partial pressures on the oxidant feed side and the permeate side of the membrane is controlled at a desired level.

The maximum allowable differential strain in the membrane is a function of several parameters, for example, the composition of the membrane material, the geometry of the membrane and membrane module, the strength of the membrane material, the desired reliability of the membrane, and the mechanical properties of the membrane material. The maximum allowable differential strain may be determined experimentally by finding the differential strain that causes failure of a membrane or leakage to occur in a membrane. For the membrane materials disclosed herein and related membrane materials for similar applications, the differential strain between the lower oxygen partial pressure, permeate surface of the membrane and the midplane of the membrane may be controlled advantageously below about 500 ppm. The differential strain between the permeate surface of the membrane and the oxidant feed surface is about twice the differential strain between the permeate surface and the midplane. Therefore, the differential strain between the permeate surface of the membrane and the oxidant feed surface may be controlled advantageously below about 1000 ppm.

Stresses, strains, and differential strains in mixed conducting metal oxide membranes may be calculated using relationships determined for each specific mixed conducting metal oxide composition. The rate of change of the differential strain is the sum of the strain creation rate due to chemical expansion caused by oxygen partial pressure changes and the creep rate. If the rate of change of the differential strain is positive, the differential strain increases with time. If the rate of change of the differential strain is negative, then the differential strain decreases with time. Increasing the oxygen partial difference across a membrane can increase the magnitude of the differential strain while creep decreases the magnitude of the differential strain.

By controlling the rate at which the oxygen partial pressure is changed on one or both sides of a membrane, one can control the rate at which the differential strain changes. If the creep rate is greater than the rate of strain creation due to chemical expansion caused by oxygen partial pressure changes, then the differential strain will decrease with time. If the creep rate is less than the rate of strain creation due to chemical expansion caused by oxygen partial pressure changes then the differential strain will increase. The creep rate as a function of stress and temperature for a specific membrane material can be measured experimentally. Methods to measure creep rates are known in art. Typical methods can be found in D. C. Crammer and R. W. Richerson, *Mechanical Testing Methodology for Ceramic Design and Reliability*, Marcel Dekker, Inc. 1998. The chemical expansion strain produced by a change in oxygen partial pressure for a specific membrane material can also be measured experimentally by methods known in the art, for example the method used by S. B. Adler in *J. Am. Ceram. Soc.* 84 (9) 2117-19 (2001).

An empirical equation to describe creep rate, dy/dt, is the power law $$dy/dt = -A_{creep} S^n P_{O2}^m \exp(-E_{creep}/RT) \qquad (1)$$

where S is the stress, y is the strain, t=time, $A_{creep}$ is the creep pre-exponential, n is the stress exponent, $P_{O2}$ is the oxygen partial pressure, m is the oxygen partial pressure exponent, $E_{creep}$ is the activation energy for creep, R is the gas constant and T is the absolute temperature. The values of $A_{creep}$, n, m, and $E_{exp}$ may be determined experimentally.

For a simple unconstrained membrane, the stress is related to the strain by $$S = yE/(1-v) \qquad (2)$$

where E is the Young's modulus and v is the Poisson's ratio. Combining equations 1 and 2 results in $$dy/dt = -A_{creep}[(E/(1-v))^n y^n P_{O2}^m \exp(-E_{creep}/RT)]. \qquad (3)$$

Equation (3) can be solved to find the strain as a function of time as the membrane creeps.

For example, for the composition $La_{0.4}Sr_{0.6}CoO_{3-\delta}$ the chemical expansion differential strain relative to the center plane of a membrane is given by the empirical equation:

$$y = [CCE1(x_v^{perm} - x_v^{feed})][(T-26°C.)/2] \qquad (4)$$

where CCE1 is an experimentally determined constant, T is the temperature (°C.), $x_v^{feed}$ is the oxygen vacancy fraction at the oxidant feed surface of the membrane at the temperature T, and $x_v^{perm}$ is the oxygen vacancy fraction at the permeate side of the membrane at the temperature T. The oxygen vacancy fraction, $x_v$, at a given temperature, T, may be calculated by the empirical equation $$x_v = x_v° P_{O2}^\beta \qquad (5)$$

where $x_v°$ is the oxygen vacancy fraction at a $P_{O2}$ of 1 atma and a temperature T. $x_v°$ is determined experimentally and β is given by the empirical equation $$\beta = -130.693(1/T) + 0.03167. \qquad (6)$$

Equations 4 and 5 can be combined to give the chemical expansion strain as a function of oxygen partial pressure $$y = [CCE1][x_v° ((P_{O2}^{perm})^\beta - (P_{O2}^{feed})^\beta)][T-26°C.)/2] \qquad (7)$$

where $P_{O2}^{perm}$ is the oxygen partial pressure on the permeate side of the membrane and $P_{O2}^{feed}$ is the oxygen partial pressure on the feed side of the membrane. Under conditions in which the oxygen partial pressure is changing, the rate of change of strain is given by $$dy/dt = [CCE1][x_v° d((P_{O2}^{perm})^\beta - (P_{O2}^{feed})^\beta)/dt][(T-26°C.)/2]. \qquad (8)$$

Under conditions in which the oxygen partial pressure is changing and the membrane is creeping, equations (3) and (8) can be combined to give an equation describing the creep rate as a function of time and the rate of change of the oxygen partial pressure:

$$dy/dt = -A_{creep}[(E/(1-v))^n y^n P_{O2}^m \exp(-E_{creep}/RT)] + CCE[x_v° d((P_{O2}^{perm}(t))^\beta - (P_{O2}^{feed}(t))^\beta)/dt] \qquad (9)$$

where CCE=CCE1 (T−26°C.)/2.

The creep relaxation of chemical expansion strain across a mixed conducting metal oxide membrane at constant temperature and $P_{O2}$ conditions can be expressed by equation (3).

These models make the assumptions that (1) a simple model adequately describes the stress state of the membrane and (2) tensile and compressive creep rates are the same. The stress model approximates a planar membrane as a plate with a step change in $P_{O2}$ at the midplane. The arithmetic average of the initial $P_{O2}$ and final feed $P_{O2}$ and permeate $P_{O2}$ is used in the creep expression to determine the creep parameters if those parameters are a function of oxygen partial pressure.

Embodiments of the invention may be practiced in the operation of membrane modules fabricated from a variety of mixed conducting metal oxide materials. For example, the mixed conducting metal oxide material may have the general stoichiometric composition $(Ln_{1-x}A_x)_w(B_{1-y}B'_y)O_{3-\delta}$, wherein Ln represents one or more elements selected from La, the D block lanthanides of the IUPAC periodic table, and Y; wherein A represents one or more elements selected from Mg, Ca, Sr and Ba; wherein B and B' each represent one or more elements selected from Sc, Ti, V, Mn, Fe, Co, Ni, Cu, Cr, Al, Or, Mg, and Ga; wherein $0 \leq x \leq 1$, $0 \leq y \leq 1$, and $0.95 < w < 1.05$; and wherein δ is a number that renders the compound charge neutral.

A more specific stoichiometric composition may have the general stoichiometric composition $(La_xCa_{1-x})_wFeO_{3-\delta}$ wherein 1.0>x>0.5, 1.1≧w≧1.0, and δ is the number which renders the composition charge neutral. In another embodiment, the mixed conducting metal oxide material may have the general stoichiometric composition $(La_xSr_{1-x})_wCoO_{3-\delta}$ wherein 1.0>x>0.1, 1.05≧w≧0.95, and δ is the number which renders the composition charge neutral. In a more specific embodiment, the mixed conducting metal oxide material may have the general stoichiometric composition $(La_{0.4}Sr_{0.6})_wCoO_{3-\delta}$ wherein 1.05≧w>0.95 and δ is the number which renders the composition charge neutral.

Heating and cooling rates used in the embodiments of the invention typically are in the range of 0.25° C./min to 10° C./min and may be in the range of 0.5° C./min to 5° C./min.

The following Examples illustrate embodiments of the present invention but do not limit the invention to any of the specific details described therein.

EXAMPLE 1

A membrane module comprises membranes made of a mixed conducting metal oxide having a composition of $La_{0.4}Sr_{0.6}CoO_{3-\delta}$, wherein δ is a number that renders the compound charge neutral and is related to the oxygen vacancy in the solid lattice. Each membrane in the module is approximated as a plane sheet separating two oxygen-containing gaseous atmospheres and the membrane is modeled using the above equations and specific properties of the $La_{0.4}Sr_{0.6}CoO_{3-\delta}$. For this material, the Young's modulus, E, is $1.48 \times 10^5$ MPa and the Poisson's ratio, v, is 0.325. The compressive and tensile creep rates are assumed to be the same and the tensile creep model as a function of $P_{O2}$ is used.

The empirical equation describing the creep rate for this material is

Creep rate=$[stress^{1.8721}][728865665\ P_{O2}^{-0.275}]\exp(-413709/(RT))$

Where the creep rate is in units of $min^{-1}$, the stress is in units of MPa, and the oxygen partial pressure is in units of atma. The oxygen nonstoichiometry properties for this material are given by the empirical equation $x_v = x_v^\circ P_{O2}^\beta$ where $x_v^\circ$ was determined experimentally to be 0.0528 at 875° C. and β is given by the empirical equation

β=−130.693(1/T)+0.03167.

The chemical expansion properties of the material are given by the equation

Expansion=$[CCE1(x_v)][T-26]$ where CCE1 is 93.355 ppm/° C. and T is the temperature in ° C.

The differential strain is defined as the difference in chemical expansion of the permeate surface of the membrane relative to the midplane of the membrane. In this example, it is desired to change the operating conditions of the membrane operating as an oxygen separation membrane at 875° C. from a feed gas oxygen partial pressure of 0.021 MPa and a permeate oxygen partial pressure of 0.101 MPa to a condition where the feed gas oxygen partial pressure is 0.303 MPa and the permeate pressure oxygen partial pressure is 0.047 MPa. During these changes, it is desirable to keep the maximum differential chemical expansion strain in the membrane material between the low oxygen partial pressure, permeate surface of the membrane and the midplane of the membrane below 500 ppm.

A membrane with the properties given above was heated to 875° C. with air at a total pressure of 0.101 MPa on the feed side of the membrane and oxygen with a total pressure of 0.101 MPa on the permeate side of the membrane. The membrane was brought to its operating condition with air on the feed side of the membrane at an oxygen partial pressure of 0.303 MPa and oxygen at an oxygen partial pressure of 0.047 MPa on the permeate side. Equations 1 and 2 were used to create a series of linear feed and permeate pressure ramps that keep the differential chemical expansion strain in the membrane material between the low oxygen partial pressure, permeate, surface of the membrane and the midplane of the membrane below 500 ppm. Each feed and permeate pressure ramp consisted of a period of linear change in either or both of the feed and permeate total pressures followed by a period of constant feed and permeate total pressures. The changes in pressure and oxygen partial pressure thus were discontinuous.

Figure 1:
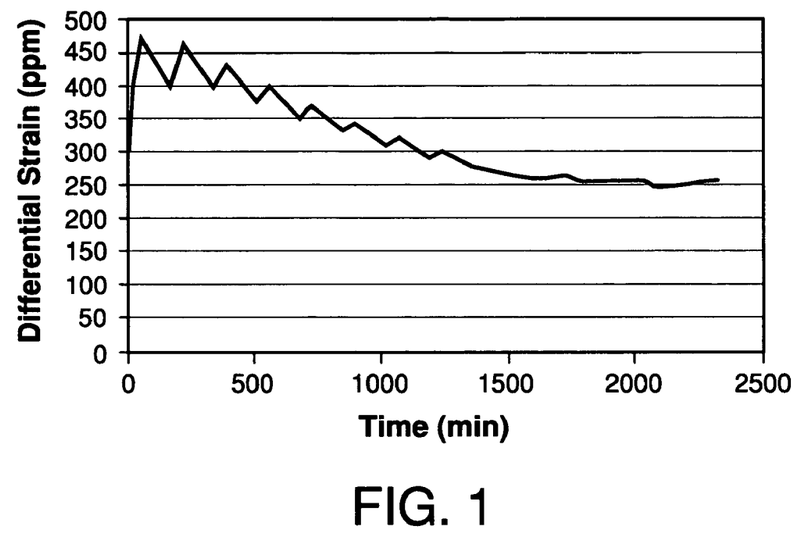
FIG. 1 is a plot of membrane differential strain vs. time during changes to the oxygen partial pressures of a mixed conducting metal oxide membrane at essentially constant temperature according to an embodiment of the present invention as illustrated in Example 1.

Table 1 describes the oxygen partial pressure ramp program designed to use creep to relax chemical expansion strain as the oxygen partial pressures on both the feed and permeate sides of the membrane were changed. The program took 2340 minutes and consisted of a series of oxygen partial pressure ramps wherein each ramp was followed by a hold at constant conditions to allow the induced strain to relax. Equation 2 was solved numerically to obtain the values of the strain as a function of time for the pressure ramp program given in Table 1. FIG. 1 shows the calculated strain history for this Example, and it is seen that the membrane differential strain in the membrane material between the low oxygen partial pressure, permeate surface of the membrane and the midplane of the membrane is controlled below 500 ppm.

TABLE 1

Oxygen Pressure and Partial Pressure Ramps vs. Time for Example 1

| Elapsed Time (minutes) | Feed Pressure (psig) | Feed $P_{O2}$ (atm) | Permeate Pressure (torr) | Permeate $P_{O2}$ (atm) |
|---|---|---|---|---|
| 0 | 0 | 0.21 | 760 | 1 |
| 50 | 25 | 0.567 | 760 | 1 |
| 170 | 25 | 0.567 | 760 | 1 |
| 220 | 50 | 0.924 | 760 | 1 |
| 340 | 50 | 0.924 | 760 | 1 |
| 390 | 75 | 1.281 | 760 | 1 |
| 510 | 75 | 1.281 | 760 | 1 |
| 560 | 100 | 1.639 | 760 | 1 |
| 680 | 100 | 1.639 | 750 | 0.987 |
| 730 | 125 | 1.996 | 750 | 0.987 |
| 850 | 125 | 1.996 | 750 | 0.987 |
| 900 | 150 | 2.353 | 750 | 0.987 |
| 1020 | 150 | 2.353 | 750 | 0.987 |
| 1070 | 175 | 2.71 | 750 | 0.987 |
| 1190 | 175 | 2.71 | 750 | 0.987 |
| 1240 | 200 | 3.067 | 750 | 0.987 |
| 1360 | 200 | 3.067 | 750 | 0.987 |
| 1480 | 200 | 3.067 | 700 | 0.921 |
| 1720 | 200 | 3.067 | 580 | 0.763 |
| 1780 | 200 | 3.067 | 580 | 0.763 |
| 2020 | 200 | 3.067 | 460 | 0.605 |
| 2080 | 200 | 3.067 | 460 | 0.605 |
| 2320 | 200 | 3.067 | 350 | 0.461 |

Figure 2:
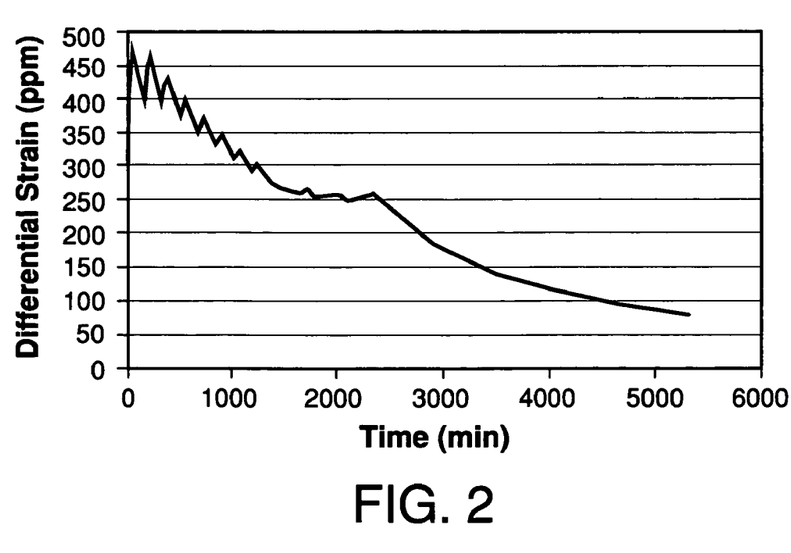
FIG. 2 is a continuation of the plot of FIG. 1 as the membrane is operated at steady state with constant oxygen partial pressures.

After the initial ramping period of 2320 minutes, the membrane continued to operate at steady state at the final feed and permeate oxygen partial pressures. The differential strain in the membrane between the low oxygen partial pressure, permeate, surface of the membrane and the midplane of the membrane was calculated as a function of time using Equation 1. The predicted differential strain decreases as the membrane begins creep relaxation after reaching final steady state conditions as shown in FIG. 2. During this entire process, the membrane remained intact and no leaks developed.

EXAMPLE 2

The operating conditions of the membrane of Example 1 at 875° C. were changed from an initial feed oxygen partial pressure of 0.021 MPa and an initial permeate oxygen partial pressure of 0.101 MPa to a final operating condition in which the feed oxygen partial pressure is 0.303 MPa and the permeate oxygen partial pressure is 0.047 MPa. During the period of partial pressure changes, the differential strain due to chemical expansion in the membrane material between the low oxygen partial pressure, permeate, surface of the membrane and the midplane of the membrane is maintained below 500 ppm. This was accomplished by a series of linear pressure ramps without the intermediate periods of strain relaxation used in Example 1. The pressure and oxygen partial pressure thus were changed continuously.

The pressure ramps are given in Table 2. The initial and final values of the feed and permeate pressures are the same as in Example 1, but the program of Example 2 consists only of pressure ramps having slower ramp rates than those of Example 1. The predicted differential strain between the low oxygen partial pressure, permeate surface of the membrane and the midplane of a membrane operated with the pressure ramps of Table 2 is given in FIG. 3 along with the differential strain history of Example 1. A maximum allowable differential strain of 500 ppm for Example 2 is the same as that of Example 1. The risk of membrane fracture due to chemical expansion using the program of Example 2 (Table 2) should be similar to the risk with the program of Table 1. The program of Table 2 only takes 950 minutes, saving over 22 hours over the program of Table 1. The savings comes from maintaining the differential strain at a higher average level than in the program of Example 1.

Figure 3:
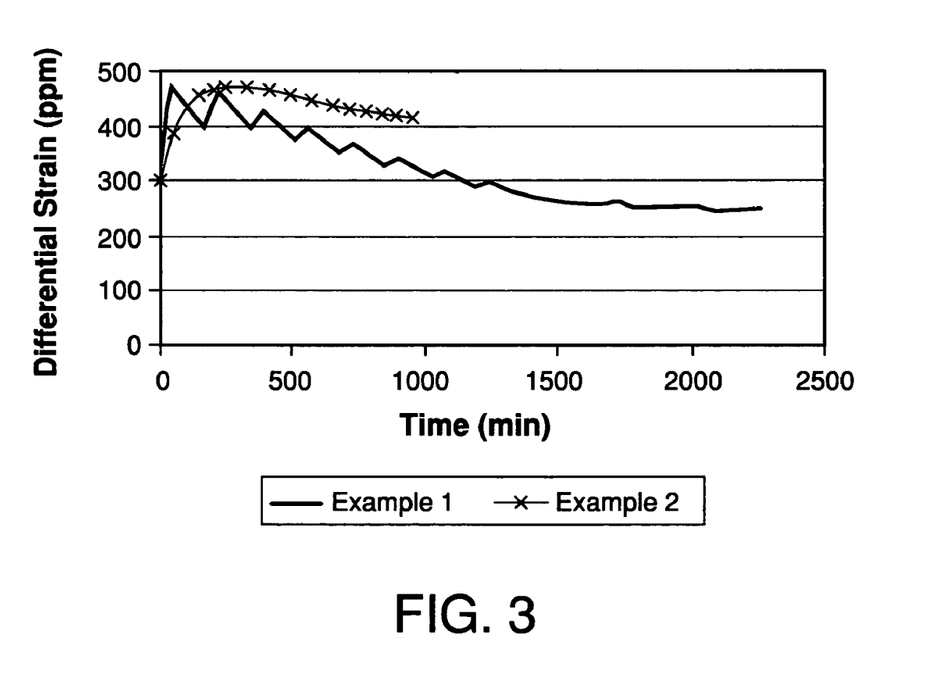
FIG. 3 is a plot of membrane differential strain vs. time during changes to the oxygen partial pressures of a mixed conducting metal oxide membrane at essentially constant temperature according to an embodiment of the present invention as illustrated in Example 2 and includes for comparison the plot of FIG. 1.

Once the maximum differential strain (470 ppm) is reached, the program approximately balances the rate of creep relaxation of strain with the rate of chemical expansion strain creation to keep the strain approximately constant. Keeping the differential strain high keeps the average stress higher. Since the creep rate is proportional to the stress to the 1.87 power, the creep rates are higher in the new program. Further time savings would be possible by adding additional ramp steps. During this entire process, the membrane remained intact and no leaks developed.

TABLE 2

Pressure Ramp Program for Example 2

| Elapsed Time (minutes) | Feed Pressure (psig) | Feed $P_{O2}$ (atma) | Permeate Pressure (torr) | Permeate $P_{O2}$ (atma) |
| --- | --- | --- | --- | --- |
| 0 | 0 | 0.21 | 760 | 1 |
| 250 | 50 | 1.14 | 650 | 0.8 |
| 650 | 135 | 2.00 | 475 | 0.625 |
| 950 | 200 | 3.07 | 350 | 0.46 |

EXAMPLE 3

A membrane made of a mixed conducting metal oxide having a composition of $La_{0.9}Ca_{0.1}FeO_{3-\delta}$ wherein $\delta$ is a number that renders the compound charge neutral and is related to the oxygen vacancy in the solid lattice, was operated at 900° C. for the generation of synthesis gas. The membrane module generates synthesis gas from an oxygen-containing feed gas having an oxygen partial pressure of 0.021 MPa on the oxidant side of the membrane. The permeate side of the membrane contains oxygen permeate gas with an oxygen partial pressure of $10^{-5}$ MPa. The membrane operation is then changed to a condition in which the oxidant side oxygen partial pressure is 0.101 MPa and the process gas on the permeate side is a partially reformed mixture of methane and steam with an equilibrium oxygen partial pressure of $3.56 \times 10^{-13}$ Pa. During this change, the maximum differential chemical expansion strain in the membrane material between the low oxygen partial pressure, permeate surface of the membrane and the midplane of the membrane is maintained below 455 ppm.

An empirical equation to describe creep rate, $dy/dt$, is the power law $$dy/dt = -A_{creep} S^n P_{O2}{}^m \exp(-E_{creep}/RT) \quad (1)$$

where S is the stress, y is the strain, t is time, $C_{reep}$ is the creep pre-exponential, n is the stress exponent, $P_{O2}$ is the oxygen partial pressure, m is the oxygen partial pressure exponent, $E_{creep}$ is the activation energy for creep, R is the gas constant and T is the absolute temperature. The values of $A_{creep}$, n, m, and $E_{exp}$ are determined experimentally.

For a simple unconstrained membrane, the stress is related to the strain by $$S = yE/(1-v) \quad (2)$$

where E is the Young's modulus and v is the Poisson's ratio. Combining equations 1 and 2 results in $$dy/dt = -A_{creep}((E/(1-v))^n y^n P_{O2}{}^m \exp(-E_{creep}/RT) \quad (3)$$

The chemical expansion differential strain relative to the center line of a membrane is given by the empirical equation $$y = CCE1 [x_v{}^{perm} - x_v{}^{feed}][(T-20° C.)/2] \quad (4)$$

where CCE1 is an experimentally determined constant, T is the temperature (° C.), $x_v{}^{feed}$ is the oxygen vacancy fraction at the feed surface of the membrane at the temperature T and $x^{perm}$ is the oxygen vacancy fraction at the permeate surface of the membrane at the temperature T. The oxygen vacancy fraction, $x_v$, at a given temperature, T, is calculated by the empirical equations $$x_v = A P_{O2}{}^B \text{ for } P_{O2} < 1.75 \times 10^{-3} \text{ atma} \quad (5A)$$

$$x_v = C P_{O2}{}^D \text{ for } 1 \text{ atma} > P_{O2} > 1.75 \times 10^{-3} \text{ atma} \quad (5B)$$

where the parameters A, B, C and D are given in Table 3.

TABLE 3

Temperature Relations of the Power Law Parameters for $La_{0.9}Ca_{0.1}FeO_{3-\delta}$

| Parameter | Slope | Intercept |
| --- | --- | --- |
| ln(A) = slope * (1/T) + intercept (A in (1/atm$^B$)) | −6961.52 | 0.165348 |
| B = slope * (1/T) + intercept | −92.437 | 0.031726 |

TABLE 3-continued

Temperature Relations of the Power Law Parameters for $La_{0.9}Ca_{0.1}FeO_{3-\delta}$

| Parameter | Slope | Intercept |
|---|---|---|
| ln(C) = slope * (1/T) + intercept (C in (1/atm$^D$)) | −16655.7 | 6.321623 |
| D = slope * (1/T) + intercept | −1709.15 | 1.07805 |

Equations 4, 5A, and 5B can be combined so that the differential chemical expansion strain as a function of oxygen partial pressure is given by $$y = CCE1[A(P_{O2}^{perm})^B - C(P_{O2}^{feed})^D][(T-20°C.)/2] \quad (7)$$

where $P_{O2}^{feed}$ is the oxygen partial pressure on the feed side of the membrane and $P_{O2}^{perm}$ is the oxygen partial pressure on the permeate side of the membrane. Under conditions in which the permeate oxygen partial pressure is changing but the feed oxygen partial pressure is constant, the rate of change of differential strain is given by $$dy/dt = CCE1[A(P_{O2}^{perm})^B][(T-20°C.)/2]. \quad (8)$$

Under conditions in which the permeate oxygen partial pressure is changing and the membrane is creeping, equations (3) and (8) can be combined to give the following equation describing the creep rate as a function of time and the rate of change of the oxygen partial pressure $$dy/dt = -A_{creep}[(E/(1-v))^n y^n \exp(-E_{creep}/RT)] + CCE[Ad((P^{perm}(t))B)/dt] \quad (9)$$

where $P^{perm}(t)$ is the permeate oxygen partial pressure as a function of time and $CCE = CCE1 [(T-20°C.)/2]$.

These models make the assumptions that (1) a simple model adequately describes the stress state of the membrane and (2) tensile and compressive creep rates are the same. The stress model approximates the membrane as a plate with a step change in $P_{O2}$ at the midplane.

The creep relaxation model is built from a number of models including a model of the creep rate, a simple model of the stress state, a model of the chemical expansion strain, an empirical model of the oxygen non-stoichiometry and, when used, a model of the pressure ramp rate.

In the present Example, the Poisson's ratio is 0.325 and the Young's modulus is described by the following linear interpolation of the Young's modulus between 850° C. and 900° C.:

$$E(MPa) = 58\, T(°C.) - 372,000 \quad (10)$$

The compressive and tensile creep rates are the same. The empirical creep relation is given by $$\text{creep rate} = (\text{stress}^{1.7201})(33171090393)\exp(-455778/(RT)) \quad (11)$$

where creep rate is in min$^{-1}$, stress is in MPa, and temperature is in °K.

The oxygen nonstoichiometry properties in this Example are given by the empirical equations $$x_v = AP_{O2}^B \text{ for } P_{O2} < 1.75 \times 10^{-3} \text{ atma} \quad (11A)$$

$$x_v = CP_{O2}^D \text{ for } 1 \text{ atma} > P_{O2} > 1.75 \times 10^{-3} \text{ atma} \quad (11B)$$

where A, B, C and D are parameters given in Table 3.

The chemical expansion properties of $La_{0.9}Ca_{0.1}FeO_{3-\delta}$ are given by the equation $$\text{Expansion (ppm)} = [CCE1(x_v)][(T-20°C.)] \quad (12)$$

where CCE1 is 86.0683 ppm/° C.

A $La_{0.9}Ca_{0.1}FeO_{3-\delta}$ membrane was initially equilibrated with air on both sides of the membrane so that there was no differential strain across the membrane. The membrane was heated to 900° C. at 0.5° C./min with air at a total pressure of 0.3 MPa on the first side of the membrane and nitrogen with a total pressure of 1.56 MPa on the second side of the membrane. The oxygen partial pressure in the nitrogen stream was 1.01 Pa. Differential strains between the permeate surface of the membrane and the midplane of the membrane were calculated at the leading edge condition of the membrane, prior to any oxygen addition to the process stream due to oxygen flux through the membrane. At the end of this temperature ramp the differential strain between the permeate surface of the membrane and the midplane of the membrane was calculated to be 181 ppm using equations 7 and 8. The membrane was then held for 7.5 days at this condition. At the end of this period, the calculated differential strain between the permeate surface of the membrane and the midplane of the membrane using equation 3 was 58.6 ppm due to creep relaxation of the stress produced by the differential strain.

At this point, the process gas stream on the permeate side (i.e., process gas side) of the membrane was changed from a nitrogen mix with an oxygen partial pressure of 1.01 Pa to a gas stream with a nitrogen mole fraction of 0.728, a steam mole fraction of 0.272, a hydrogen mole fraction of $5.25 \times 10^{-4}$, a $CO_2$ mole fraction of $2.55 \times 10^{-5}$, a CO mole fraction of $1.4 \times 10^{-4}$ and a $CH_4$ mole fraction of $4.22 \times 10^{-5}$. The temperature was reduced to 880° C. and the total pressure was maintained at 1.56 MPa. The equilibrium $P_{O2}$ of this gas mixture on the permeate side was $2.3 \times 10^{-7}$ Pa. The differential strain between the permeate surface of the membrane and the midplane of the membrane immediately after the introduction of this gas mixture was calculated to be 387 ppm. The membrane was held at this temperature and these gas conditions for 3.5 days. At the end of this period, equation 3 was used to calculate a differential strain differential strain between the permeate surface of the membrane and the midplane of the membrane of 119 ppm, which occurred due to creep relaxation of the stress produced by the differential strain.

Next, the gas composition on the permeate side was ramped linearly over a period of 2.4 days to a composition with a nitrogen mole fraction of 0.726, a steam mole fraction of 0.271, a hydrogen mole fraction of $2.59 \times 10^{-3}$, a $CO_2$ mole fraction of $1.27 \times 10^{-4}$, a CO mole fraction of $6.96 \times 10^{-4}$ and a $CH_4$ mole fraction of $2.10 \times 10^{-4}$. The temperature was maintained at 880° C. and the total pressure was maintained at 1.56 MPa. The equilibrium $P_{O2}$ of this gas mixture was $9.17 \times 10^{9}$ Pa at the end of the ramp. The differential strain during the ramp was calculated using equation 4 and the maximum differential strain between the permeate surface of the membrane and the midplane of the membrane during the ramp was 228 ppm. The differential strain between the permeate surface of the membrane and the midplane of the membrane at the end of the ramp was calculated to be 124 ppm.

The gas composition on the permeate side then was linearly ramped over a period of 2.3 days to a composition with a nitrogen mole fraction of 0.716, a steam mole fraction of 0.267, a hydrogen mole fraction of $1.24 \times 10^{-2}$, a $CO_2$ mole fraction of $6.05 \times 10^{-4}$, a CO mole fraction of $3.23 \times 10^{-3}$ and a $CH_4$ mole fraction of $1.00 \times 10^{-3}$. The temperature was maintained at 880° C. and the total pressure was maintained at 1.56 MPa. The equilibrium $P_{O2}$ of this gas mixture was $3.94 \times 10^{-10}$ Pa at the end of the ramp. The differential strain between the permeate surface of the membrane and the midplane of the membrane during the ramp was calculated using equation 4, and the maximum peak differential strain during the ramp was 284 ppm. The differential differential strain between the permeate surface of the membrane and the midplane of the membrane at the end of the ramp was calculated to be 240 ppm.

Next, the gas composition on the permeate side of the membrane was changed quickly (i.e., in a step change) to a composition with a nitrogen mole fraction of 0.707, a steam mole fraction of 0.264, a hydrogen mole fraction of $2.11 \times 10^{-2}$, a $CO_2$ mole fraction of $1.03 \times 10^{-3}$, a CO mole fraction of $5.65 \times 10^{-3}$ and a $CH_4$ mole fraction of $1.71 \times 10^{-3}$. The temperature was maintained at 880° C. and the total pressure was maintained at 1.56 MPa. The equilibrium $P_{O2}$ of this gas mixture was $1.33 \times 10^{-10}$ Pa after the composition change. The differential strain between the permeate surface of the membrane and the midplane of the membrane during the ramp was calculated using equations 7 and 8. The differential strain was 288 ppm.

At this point, the gas composition on the permeate side of the membrane was linearly ramped over a period of 0.625 days to a composition with a nitrogen mole fraction of 0.607, a steam mole fraction of 0.272, a hydrogen mole fraction of 0.087, a $CO_2$ mole fraction of 0.004, a CO mole fraction of 0.023 and a $CH_4$ mole fraction of 0.007. The temperature was maintained at 880° C. and the total pressure was maintained at 1.56 MPa. The equilibrium $P_{O2}$ of this gas mixture was $8.38 \times 10^{-12}$ Pa at the end of the ramp. A peak differential strain between the permeate surface of the membrane and the midplane of the membrane of 366 ppm during the ramp was calculated using equation 4. The differential strain at the end of the ramp was calculated to be 356 ppm.

At this point, the gas composition on the permeate side was linearly ramped over a period of 0.833 days to a composition with a nitrogen mole fraction of 0, a steam mole fraction of 0.272, a hydrogen mole fraction of 0.52, a $CO_2$ mole fraction of 0.025, a CO mole fraction of 0.140 and a $CH_4$ mole fraction of 0.042. The temperature was maintained at 880° C. and the total pressure was maintained at 1.56 MPa. The equilibrium $P_{O2}$ of this gas mixture was $3.56 \times 10^{-13}$ Pa at the end of the ramp. A peak differential strain between the permeate surface of the membrane and the midplane of the membrane of 445 ppm during the ramp was calculated using equation 4. The differential strain at the end of the ramp was calculated to be 428 ppm. During this entire process, the membrane remained intact and no leaks developed.

EXAMPLE 4

In this example, the operating conditions of the membrane of Example 3 at 900° C. were changed from a first condition in which oxidant feed oxygen partial pressure was 0.021 MPa and the process gas (permeate) oxygen partial pressure was $10^{-5}$ MPa to a second condition in which the oxidant feed oxygen partial pressure was 0.101 MPa and the process gas on the permeate side was a partially reformed mixture of methane and steam with an equilibrium oxygen partial pressure of $3.56 \times 10^{-13}$ Pa. This change was made without controlling the rate at which the oxygen partial pressure was changed.

The membrane was initially equilibrated with air on both sides, and thus there was no initial differential strain across the membrane. The membrane then was heated from ambient temperature to 880° C. at 0.5° C./min with air at a total pressure of 0.3 MPa on the oxidant side of the membrane and with a nitrogen-oxygen mixture at a total pressure of 1.56 MPa on the permeate side of the membrane wherein the oxygen partial pressure in the nitrogen stream was 1.01 Pa. Differential strains between the permeate surface of the membrane and the midplane of the membrane were calculated at the leading edge of the membrane before any oxygen permeation into the process stream occurred due to oxygen flux through the membrane. At the end of this temperature ramp, the differential strain between the permeate surface of the membrane and the midplane of the membrane was calculated to be 161 ppm using equations 7 and 8.

At this point the gas composition on the permeate side of the membrane was changed quickly to a composition with a nitrogen mole fraction of 0.707, a steam mole fraction of 0.264, a hydrogen mole fraction of $2.11 \times 10^{-2}$, a $CO_2$ mole fraction of $1.03 \times 10^{-3}$, a CO mole fraction of $5.65 \times 10^{-3}$, and a $CH_4$ mole fraction of $1.71 \times 10^{-3}$. The temperature was maintained at 880° C. and the total pressure was maintained at 1.56 MPa on the permeate side of the membrane. The equilibrium $P_{O2}$ of this gas mixture was $1.33 \times 10^{-10}$ Pa after the composition change.

A differential strain between the permeate surface of the membrane and the midplane of the membrane of 527 ppm after the composition change was calculated using equations 7 and 8. Immediately after changing the gas composition, the membrane failed and a large leak develop from the high pressure side of the membrane to the low pressure air side of the membrane. This example illustrates that a rapid increase in the differential strain above a maximum allowable value, without allowing for any creep relaxation in the membrane, can cause the membrane to fail.

In the Examples presented above, the membrane was modeled as a simple plane or sheet separating the oxidant feed side and the permeate side of the membrane. This is a very simple model of the membrane. More detailed structural models of membranes with more complex geometries may be used to predict stresses and strains that result from gradients in oxygen activity in which the strain and stress profiles are not symmetric through the thickness of the membrane. A finite element model of the membrane is an example of a method that may be used to calculate stress and strain profiles as a function of time and gas atmosphere parameters.

The invention claimed is:

1. A method of operating an oxygen-permeable mixed conducting membrane comprising a dense layer of a mixed conducting metal oxide material, having an oxidant feed side, an oxidant feed surface, a permeate side, and a permeate surface, which method comprises controlling differential strain between the permeate surface and the oxidant feed surface at a value below a selected maximum value by varying oxygen partial pressure on either or both of the oxidant feed side and the permeate side of the oxygen-permeable mixed conducting membrane.

2. The method of claim 1 wherein the temperature of the oxygen-permeable mixed conducting membrane is maintained at an essentially constant temperature.

3. The method of claim 1 wherein the selected maximum value of the differential strain between the permeate surface and the oxidant feed surface is less than about 1000 ppm.

4. The method of claim 1 wherein the oxygen partial pressure on either or both of the oxidant feed side and the permeate side of the oxygen-permeable mixed conducting membrane is varied either continuously or discontinuously.

5. The method of claim 1 wherein the oxygen partial pressure is controlled on either or both of the oxidant feed side and the permeate side of the oxygen-permeable mixed conducting membrane by varying either or both of oxygen mole fraction and total gas pressure on either or both of the oxidant feed side and the permeate side of the oxygen-permeable mixed conducting membrane.

6. The method of claim 1 wherein the oxygen partial pressure on the permeate side of the oxygen-permeable mixed conducting membrane is controlled by (a) passing through the permeate side of the oxygen-permeable mixed conducting membrane a gaseous mixture comprising one or more reducing gases selected from CO, H$_2$, and CH$_4$ and one or more oxygen-containing gases selected from CO$_2$ and H$_2$O; and (b) varying the composition of the gaseous mixture and optionally the total gas pressure on the permeate side of the oxygen-permeable mixed conducting membrane.

7. The method of claim 6 wherein the mixed conducting metal oxide material has the general stoichiometric composition (Ln$_{1-x}$A$_x$)$_w$(B$_{1-y}$B'$_y$)O$_{3-\delta}$, wherein Ln represents one or more elements selected from La, the D block lanthanides of the IUPAC periodic table, and Y; wherein A represents one or more elements selected from Mg, Ca, Sr and Ba; wherein B and B' each represent one or more elements selected from Sc, Ti, V, Mn, Fe, Co, Ni, Cu, Cr, Al, Zr, Mg, and Ga; wherein 0≦x≦1, 0≦y≦1, and 0.95<w<1.05; and wherein δ is a number that renders the compound charge neutral.

8. The method of claim 7 wherein the mixed conducting metal oxide material has the general stoichiometric composition (La$_x$Ca$_{1-x}$)$_w$FeO$_{3-\delta}$ wherein 1.0 >x >0.5, 1.1 ≧w≧1.0, and δ is a number which renders the composition charge neutral.

9. The method of claim 7 wherein the mixed conducting metal oxide material has the general stoichiometric composition (La$_x$Sr$_{1-x}$)$_w$CoO$_{3-\delta}$ wherein 1.0 >x>0.1, 1.05 ≧w>0.95, and δ is a number which renders the composition charge neutral.

10. The method of claim 9 wherein the mixed conducting metal oxide material has the general stoichiometric composition (La$_{0.4}$Sr$_{0.6}$)$_{wCoO_{3-\delta}}$ wherein 1.05≧w>0.95 and δ is a number which renders the composition charge neutral.

11. A method of operating an oxygen-permeable mixed conducting membrane comprising a dense layer of a mixed conducting metal oxide material, having an oxidant feed side, an oxidant feed surface, a permeate side, a permeate surface, and a membrane midplane equidistant from the oxidant feed surface and the permeate surface, which method comprises controlling differential strain between the permeate surface and the midplane of the oxygen-permeable mixed conducting membrane at a value below a selected maximum value by varying oxygen partial pressure on either or both of the oxidant feed side and the permeate side of the oxygen-permeable mixed conducting membrane.

12. The method of claim 11 wherein the selected maximum value of the differential strain between the permeate surface and the oxygen-permeable mixed conducting membrane midplane is less than about 500 ppm.

13. A method of operating an oxygen-permeable mixed conducting membrane comprising a dense layer of a mixed conducting metal oxide material, having an oxidant feed side, an oxidant feed surface, a permeate side, and a permeate surface, wherein the method comprises (a) heating the oxygen-permeable mixed conducting membrane to a selected essentially constant temperature, introducing a first dioxygen-containing gas into the oxidant feed side, and introducing a second dioxygen-containing gas into the permeate side;

(b) determining oxygen partial pressures on the feed and permeate sides of the oxygen-permeable mixed conducting membrane;

(c) determining an initial differential strain between the permeate surface and the oxidant feed surface of the oxygen-permeable mixed conducting membrane at the selected essentially constant temperature;

(d) determining a maximum allowable differential strain between the oxidant feed and permeate surfaces of the oxygen-permeable mixed conducting membrane at the selected essentially constant temperature; and (e) changing the oxygen partial pressure on either or both of the feed side and the permeate side at the selected essentially constant temperature, and maintaining the differential strain between the oxidant feed surface and the permeate surface at values less than the maximum allowable differential strain.

14. The method of claim 13 wherein the oxygen partial pressure on either or both of the oxidant feed side and the permeate side of the oxygen-permeable mixed conducting membrane is controlled by varying either or both of oxygen mole fraction and total pressure on either or both of the oxidant feed side and the permeate side of the oxygen-permeable mixed conducting membrane.

15. The method of claim 13 wherein the oxygen partial pressure on the permeate side of the oxygen-permeable mixed conducting membrane is controlled by (a) introducing into the permeate side of the oxygen-permeable mixed conducting membrane a gaseous mixture comprising one or more reducing gases selected from CO, H$_2$, and CH$_4$ and one or more oxygen-containing gases selected from CO$_2$ and H$_2$O; and (b) varying the composition of the gaseous mixture and optionally the total gas pressure on the permeate side of the oxygen-permeable mixed conducting membrane.

16. The method of claim 13 wherein the oxygen partial pressure on either or both of the oxidant feed side and the permeate side of the oxygen-permeable mixed conducting membrane is varied continuously.

17. The method of claim 13 wherein the oxygen partial pressure on either or both of the oxidant feed side and the permeate side of the oxygen-permeable mixed conducting membrane is varied discontinuously.

18. The method of claim 11 wherein the mixed conducting metal oxide material has the general stoichiometric composition (Ln$_{1-x}$A$_x$)$_{w(B1-y}$B'$_y$)O$_{3-\delta}$, wherein Ln represents one or more elements selected from La, the D block lanthanides of the IUPAC periodic table, and Y; wherein A represents one or more elements selected from Mg, Ca, Sr and Ba; wherein B and B' each represent one or more elements selected from Sc, Ti, V, Mn, Fe, Co, Ni, Cu, Cr, Al, Zr, Mg, and Ga; wherein 0≦x≦1, 0≦y≦1, and 0.95<w<1.05; and wherein δ is a number that renders the compound charge neutral.

19. The method of claim 18 wherein the mixed conducting metal oxide material has the general stoichiometric composition (La$_x$Ca$_{1-x}$)$_{w\,FeO_{3-\delta}}$ wherein 1.0 >x >0.5, 1.1 ≧w≧1.0, and δ is a number which renders the composition charge neutral.

20. The method of claim 19 wherein the mixed conducting metal oxide material has the general stoichiometric composition (La$_x$Sr$_{1-x}$)$_w$CoO$_{3-\delta}$ wherein 1.0 >x>0.1, 1.05 ≧w >0.95, and δ is a number which renders the composition charge neutral.

21. The method of claim 20 wherein the mixed conducting metal oxide material has the general stoichiometric composition (La$_{0.4}$Sr$_{0.6}$)$_w$CoO$_{3-\delta}$ wherein 1.05 ≧w>0.95 and δ is a number which renders the composition charge neutral.

22. A method of operating a mixed conducting membrane oxygen recovery system, the method comprising (a) providing at least one membrane module comprising an oxygen-permeable mixed conducting membrane comprising a dense layer of a mixed conducting metal oxide material, wherein the oxygen-permeable mixed conducting membrane has an oxidant feed side, an oxidant feed surface, a permeate side, and a permeate surface;

(b) heating the oxygen-permeable mixed conducting membrane and membrane module to a selected essentially constant temperature, introducing an oxygen-containing gas into the oxidant feed side, and withdrawing an oxygen-enriched gas from the permeate side;

(c) determining oxygen partial pressures on the feed and permeate sides of the oxygen-permeable mixed conducting membrane;

(d) determining an initial differential strain between the oxidant feed surface and the permeate surface of the oxygen-permeable mixed conducting membrane at the selected essentially constant temperature;

(e) determining a maximum allowable differential strain between the oxidant feed surface and permeate surface of the oxygen-permeable mixed conducting membrane at the selected essentially constant temperature; and (f) changing the oxygen partial pressure on either or both of the feed side and the permeate side at the selected essentially constant temperature, and maintaining the differential strain between the permeate surface and the oxidant feed surface at values less than the maximum allowable differential strain.

23. The method of claim 22 wherein the maximum value of the differential strain between the permeate surface and the oxidant feed surface is less than about 1000 ppm.

24. The method of claim 22 wherein the oxygen partial pressure on either or both of the oxidant feed side and the permeate side of the oxygen-permeable mixed conducting membrane is varied continuously.

25. The method of claim 22 wherein the oxygen partial pressure on either or both of the oxidant feed side and the permeate side of the oxygen-permeable mixed conducting membrane is varied discontinuously.

26. The method of claim 22 wherein the mixed conducting metal oxide material has the general stoichiometric composition $(Ln_{1-x}A_x)_w(B_{1-y}B'_y)O_{3-\delta}$, wherein Ln represents one or more elements selected from La, the D block lanthanides of the IUPAC periodic table, and Y; wherein A represents one or more elements selected from Mg, Ca, Sr and Ba; wherein B and B' each represent one or more elements selected from Sc, Ti, V, Mn, Fe, Co, Ni, Cu, Cr, Al, Zr and Ga; wherein $0 \leq x \leq 1$, $0 \leq y \leq 1$, and $0.95 < w < 1.05$; and wherein $\delta$ is a number that renders the compound charge neutral.

27. The method of claim 25 wherein the mixed conducting metal oxide material has the general stoichiometric composition $(La_xSr_{1-x})_w CoO_{3-\delta}$ wherein $1.0 > x > 0.1$, $1.05 \geq w > 0.95$, and $\delta$ is a number which renders the composition charge neutral.

28. The method of claim 27 wherein the mixed conducting metal oxide material has the general stoichiometric composition $(La_{0.4}Sr_{0.6})_w CoO_{3-\delta}$ wherein $1.05 \geq w > 0.95$ and $\delta$ is a number which renders the composition charge neutral.

29. A method of operating a mixed conducting membrane hydrocarbon oxidation system, which method comprises (a) providing at least one membrane module comprising an oxygen-permeable mixed conducting membrane comprising a dense layer of a mixed conducting metal oxide material, wherein the oxygen-permeable mixed conducting membrane has an oxidant feed side, an oxidant feed surface, a permeate side, and a permeate surface;

(b) heating the oxygen-permeable mixed conducting membrane and membrane module to a selected essentially constant temperature, introducing an oxygen-containing gas into the oxidant feed side of the membrane module, introducing a hydrocarbon-containing gas into the permeate side of the membrane module, and withdrawing a hydrocarbon oxidation product from the permeate side of the membrane module; and (c) determining oxygen partial pressures on the oxidant feed and permeate sides of the oxygen-permeable mixed conducting membrane;

(d) determining an initial differential strain between the oxidant feed surface and the permeate surface of the oxygen-permeable mixed conducting membrane at the selected essentially constant temperature;

(e) determining a maximum allowable differential strain between the oxidant feed surface and the permeate surface of the oxygen-permeable mixed conducting membrane at the selected essentially constant temperature; and (f) changing the oxygen partial pressure on either or both of the oxidant feed side and the permeate side at the selected essentially constant temperature, and maintaining the differential strain between the permeate surface and the oxidant feed surface at values less than the maximum allowable differential strain.

30. The method of claim 29 wherein the hydrocarbon-containing gas comprises methane and the hydrocarbon oxidation product comprises hydrogen and carbon monoxide.

31. The method of claim 29 wherein the maximum value of the differential strain between the permeate surface and the oxidant feed surface is less than about 1000 ppm.

32. The method of claim 29 wherein the oxygen partial pressure on either or both of the oxidant feed side and the permeate side of the oxygen-permeable mixed conducting membrane is varied continuously.

33. The method of claim 29 wherein the oxygen partial pressure on either or both of the oxidant feed side and the permeate side of the oxygen-permeable mixed conducting membrane is varied discontinuously.

34. The method of claim 29 wherein the oxygen partial pressure is controlled by varying either or both of oxygen mole fraction and total gas pressure on either or both of the oxidant feed side and the permeate side of the oxygen-permeable mixed conducting membrane.

35. The method of claim 29 wherein the oxygen partial pressure on the oxidant feed side is controlled by varying the oxygen mole fraction on the oxidant feed side.

36. The method of claim 29 wherein the oxygen partial pressure on the permeate side of the oxygen-permeable mixed conducting membrane is controlled by (a) introducing into the permeate side of the oxygen-permeable mixed conducting membrane a gaseous mixture comprising one or more reducing gases selected from $CO$, $H_2$, and $CH_4$ and one or more oxygen-containing gases selected from $CO_2$ and $H_2O$; and (b) varying the composition of the gaseous mixture and optionally the total gas pressure on the permeate side of the oxygen-permeable mixed conducting membrane.

37. The method of claim 29 wherein the mixed conducting metal oxide material has the general stoichiometric composition $(Ln_{1-x}A_x)_{w(B1-y} B'_y)O_{3-\delta}$, wherein Ln represents one or more elements selected from La, the D block lanthanides of the IUPAC periodic table, and Y; wherein A represents one or more elements selected from Mg, Ca, Sr and Ba; wherein B and B' each represent one or more elements selected from Sc, Ti, V, Mn, Fe, Co, Ni, Cu, Cr, Al, Zr, Mg, and Ga; wherein $0 \leq x \leq 1$, $0 \leq y \leq 1$, and $0.95 < w < 1.05$; and wherein $\delta$ is a number that renders the compound charge neutral.

38. The method of claim 37 wherein the mixed conducting metal oxide material has the general stoichiometric composition $(La_{0.4}Ca_{1-x})_w FeO_{3-\delta}$ wherein $1.0 > x > 0.5$, $1.1 \geq w \geq 1.0$, and $\delta$ is a number which renders the composition charge neutral.

* * * * *

UNITED STATES PATENT AND TRADEMARK OFFICE
CERTIFICATE OF CORRECTION

PATENT NO. : 7,468,092 B2  
APPLICATION NO. : 11/115778  
DATED : December 23, 2008  
INVENTOR(S) : Michael Francis Carolan Page 1 of 1

It is certified that error appears in the above-identified patent and that said Letters Patent is hereby corrected as shown below:

Column 28, Line 62

In claim 38 delete "$(La_{0.4}Ca_{1-x})_w$" and insert -- $(La_xCa_{1-x})_w$ --

Signed and Sealed this

Seventeenth Day of February, 2009

JOHN DOLL  
*Acting Director of the United States Patent and Trademark Office*